:::::::::::::::::::::::::::::::::::::::::::::::::::::::::::::::::::::::::::::::::::::::::::::::::

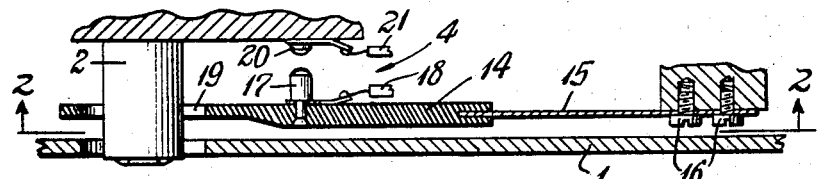
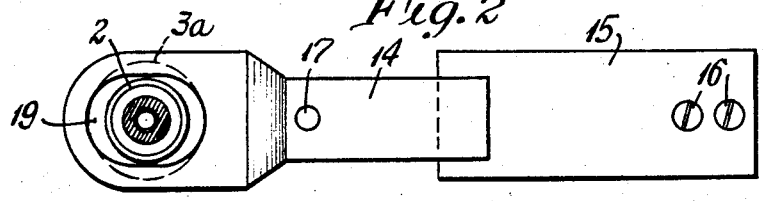
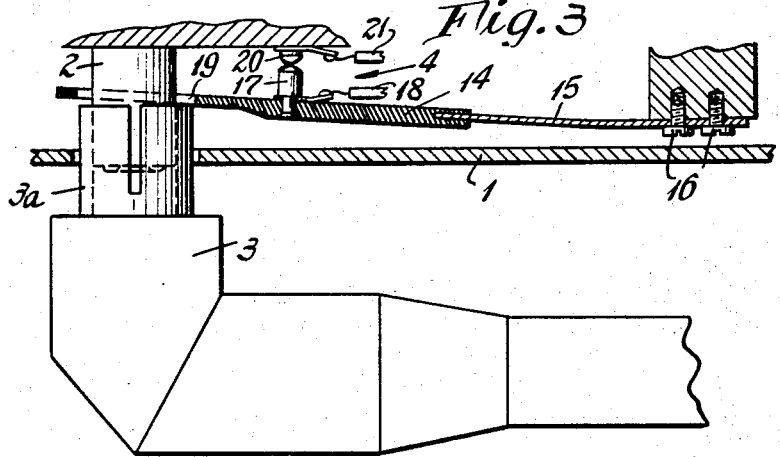
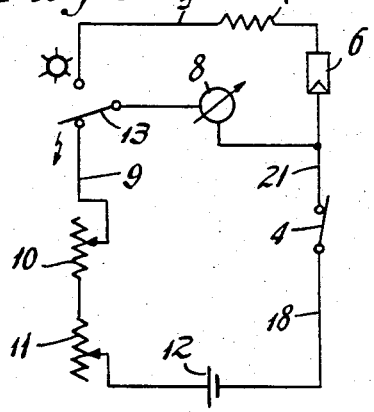

United States Patent Office 3,406,619
Patented Oct. 22, 1968

3,406,619
FLASH ATTACHMENT DEVICE FOR PHOTOGRAPHIC CAMERAS
Waldemar T. Rentschler, Calmbach (Enz), Germany, assignor to Prontor-Werk Alfred Gauthier, G.m.b.H., Calmbach (Enz), Germany, a corporation of Germany
Filed Apr. 1, 1965, Ser. No. 444,752
Claims priority, application Germany, Apr. 9, 1964, G 40,309
2 Claims. (Cl. 95—10)

ABSTRACT OF THE DISCLOSURE

A photographic camera that provides for the arrangement of a switch which is positively actuated when a flash device is attached to the camera so that when taking flash pictures the switch connects the exposure meter of the camera, charged with photo-cell current in the daylight range, to a voltage source independent of illumination. This connection is positively cut-off when the flash device is removed.

---

The present invention relates to a photographic camera having a fixture for receiving a flash lamp ignitable by the synchronized flash contact of the camera shutter. This camera also has a switch for connecting or disconnecting a battery to supply current to an exposure meter which becomes operative when flash exposures are to be carried out. The present invention is particularly directed toward solving the problem of connecting and disconnecting this battery without requiring additional effort on the part of the photographer.

Cameras having automatic flash systems wherein an exposure meter is used in the automatic setting of the diaphragm for flash operation as well as for daylight exposures are well known to those skilled in the art. To effect the desired results, these cameras must be provided with a voltage source such as a battery, for example, which is independent of the photo-electric current for supplying the exposure meter with current. Heretofore, in order to connect or disconnect the battery, a switch has been provided on these cameras which is actuated by the photographer as a separate step in the picture taking operation. This actuation of the switch requires the attention of the photographer since he must remember to connect the battery by actuating the switch before taking flash exposures and he must not forget to disconnect the battery by actuating the switch after the exposure has been taken. An important point is that the photographer should not forget to disconnect the battery when it is not needed; otherwise the battery is unnecessarily drained, thereby shortening its useful life.

The present invention provides an arrangement whereby the battery switch becomes actuated so as to close the battery circuit automatically upon the connection of the flash lamp. Such actuation of the battery switch may be effected by the connection of some portion or member of the flash lamp, such as the flash lamp cable or the flash lamp structure itself. The result is that the battery is automatically connected when the flash lamp is attached to the camera and is disconnected when the flash lamp is removed from the camera. Both effects take place without a conscious effort on the part of the photographer. Because the battery is disconnected from the circuit at the proper instant, there is no unnecessary drainage of power from the battery.

Another feature of the invention resides in the fact that the battery switch comprises a movable actuating member which is arranged directly adjacent to the contact nipple associated with the synchronized flash contact and that the switch is moved when the cable plug of the flash lamp is connected to the contact nipple. Thus, the step of connecting the contact plug to the camera also closes the battery switch.

As to the details of the battery switch, the present invention provides that the actuating member of the battery switch comprises a blade or reed made, for example, of plastic. One end of the blade is connected to an elastic or spring plate fixed to the camera case or housing, while the other end of the blade has an opening through which the contact nipple passes. The blade carries a contact pin which is pressed against a fixed contact pin when the cable plug is inserted, thereby closing the battery switch. Such an arrangement provides a sturdy and functionally dependable unit composed of a relatively small number of parts.

In another embodiment of the invention, the desired switching effect is achieved when the flash lamp is inserted into its receiving holder. This receiving holder may, for example, be a finder shoe. This arrangement makes possible the incorporation of the present invention in a camera in which a flash lamp is mounted without a cable. Here again, the desired connection and disconnection of the battery is effected without any conscious effort on the part of the photographer. Also, no unnecessary drainage of the battery occurs since the battery is disconnected when it is not needed.

An embodiment of the invention will be described below by way of the accompanying drawings, in which:

FIG. 1 shows a portion of a camera constructed in accordance with the present invention having a battery switch arranged in the region of the flash contact nipple in such position that the battery is disconnected from its circuit;

FIG. 2 is a sectional view taken along line 2—2 of FIG. 1;

FIG. 3 shows the battery switch of FIG. 1 with the switch actuated by the insertion of the cable plug of a flash lamp so that the battery is connected to its circuit;

FIG. 4 is a partial perspective view of a photographic camera constructed in accordance with the present invention having an actuating member for the battery switch arranged in the region of a finder shoe; and FIG. 5 is a schematic diagram of the circuits which effect the automatic setting of the diaphragm for both daylight and flash operation.

Referring to FIGS. 1, 2 and 3, reference numeral 1 designates the front wall of a photographic camera having a mechanism for automatically setting the diaphragm of the camera. This mechanism includes an exposure meter and a sensing device which acts in conjunction with the exposure meter and which may be used for exposure settings in both daylight and flash operation. A flash contact nipple 2 is set back in the front wall 1 in the conventional manner. The nipple 2 serves to receive a cable plug 3 of a flash lamp which has been omitted from the drawing for the sake of clarity.

While the exposure meter is supplied with current from a photo-cell for operation in the daylight range, a voltage source independent of the photo-electric current is provided for supplying current to the exposure meter when the camera is operated with a flash lamp. This independent voltage source may, for example, be a battery which is automatically connected by a switch 4 as the cable plug 3 is pushed onto the flash contact nipple 2.

FIG. 5 shows the arrangement of the battery switch 4 in the electric measuring device of the camera. Reference numeral 5 designates that portion of the circuit which controls the diaphragm setting for daylight exposures. Included in this circuit are a photo-cell 6, a calibration resistance 7 and a measuring meter 8.

Reference numeral 9 designates that portion of the circuit which becomes operative when the camera is to be operated with a flash lamp. In particular, this portion of the circuit includes a variable resistor 10 which is set at a value corresponding to the guide number value of the type of flash bulb which is to be used for the particular flash exposure. Also included in circuit 9 is a second variable resistor 11 which acts in conjunction with the distance setting member or the lens setting member. A battery 12 and the battery switch 4 are also included in circuit 9. A selector switch 13 which may be coupled to a setting member serving to set or reverse the camera from one operating range to the other connects the measuring meter 8 to either circuit 5 or circuit 9. In FIG. 5, the selector switch 13 is so positioned as to select the automatic flash circuit. The battery 12 is seen to be connected into the circuit by way of the closed battery switch 4.

As shown in FIGS. 1, 2 and 3, the battery switch 4 may be arranged in the region of the contact nipple 2. The switch 4 may comprise an actuating member 14 made of plastic, for example. The actuating member 14 may itself be resilient or be affixed to an elastic or spring plate 15 as shown in the drawing. The plate 15 is affixed to the camera housing by means of two screws 16.

The actuating member 14 carries a contact pin 17 to which a wire 18 leading to the battery 12 is connected. The assembly of the actuating member 14 with the plate 15 and the contact pin 17 may be carried out by placing the two metal members into an injection mold and then applying the plastic. The free end of the actuating member 14 has an aperture 19 through which the contact nipple 2 is passed. The fixed contact pin 20, to which a wire 21 is connected, is arranged opposite the movable contact pin 17. Wire 21, in turn, leads to the measuring meter 8.

A battery switch constructed in accordance with the present invention is actuated in the following manner:

For the condition of the battery switch 4 illustrated in FIG. 1, the circuit 9 is open so that no energy is supplied by the battery 12. This open circuit of the battery switch 4 is effected automatically by the action of the elastic or spring plate 15 upon the cable plug 3 being pulled off of the nipple 2. If the camera is to be operated with a flash lamp, the automatic flash system of the camera is first connected by means of the selector switch 13. The cable plug 3 of the flash lamp is then pushed onto the contact nipple with the sleeve 3a of the cable plug 3 engaging the free end of the actuating member 14. The result is that the contact pin 17 of the actuating member comes into contact with the fixed contact pin 20 so that the battery switch 4 is closed. FIG. 3 illustrates the actuation of the battery switch 4 as the cable plug 3 is pushed onto the contact nipple 2.

After a flash exposure has been effected, the cable plug 3 is pulled off of the contact nipple 2 in the usual manner. The actuating member 14 is thereby free to pivot downwardly due to the action of the elastic or spring plate 15 so that the battery switch opens automatically.

FIG. 4 shows how a battery switch according to the present invention may also be utilized in cameras to which a flash lamp not having a connecting cable is attached. For the arrangement shown in FIG. 4, the battery switch is in the region of a finder shoe 22. The finder shoe 22 has an aperture 23 in its base or bottom surface. A guided actuating member 24 having at least one sloping or bevelled surface projects through the aperture 23. The remaining details of the battery switch have not been shown in FIG. 4 since an arrangement similar to the one shown in FIGS. 1, 2 and 3 may be utilized.

As a flash lamp is pushed into the finder shoe 22, the actuating member 24 is pushed downward into the housing of the camera against the action of an elastically yielding element with the result that the battery switch closes. When the flash lamp is removed, the elastically yielding element pushes member 24 upward with the result that the battery switch is again open. As was the case with the embodiment of the invention shown in FIGS. 1, 2 and 3, the battery switch arrangement in FIG. 4 is closed and opened automatically as the flash lamp is attached or removed without any additional effort on the part of the photographer.

While there have been described what are at present considered to be the preferred embodiments of this invention, it will be obvious to those skilled in the art that various changes and modifications may be made therein without departing from the invention and it is, therefore, aimed to cover all such change and modifications as fall within the true spirit and scope of the invention.

What is claimed is:
1. A photographic camera comprising:
(a) a flash lamp contact nipple adapted to receive a flash lamp plug;
(b) an exposure meter;
(c) a battery for supplying current to said exposure meter when connected to said exposure meter;
(d) and a normally open switch positioned in the region of said nipple for connecting said exposure meter and said battery, said switch being closed by a flash lamp cable plug as said plug is received by said nipple and being opened as said plug is removed from said nipple;
(e) wherein the switch includes a resiliently moving member having a first contact pin which contacts a second contact pin as the cable plug is received by the nipple;
(f) and wherein the moving member is a plastic blade connected at one end to a resilient plate which is fixed to the camera housing, the other end of the plastic blade having an aperture through which the nipple is passed.

2. A photographic camera comprising:
(a) a flash lamp contact nipple adapted to receive a flash lamp plug;
(b) an electrical circuit means for effecting the automatic setting of the diaphragm of the camera in both the daylight and flash ranges;
(c) an exposure meter in said circuit and operable in both the flash and daylight ranges of the camera;
(d) a battery for supplying current to said exposure meter when connected to said exposure meter in the flash range of said camera;
(e) a normally open switch positioned adjacent said nipple for connecting said exposure meter and said battery, said switch being closed by a flash lamp cable plug as said plug is received by said nipple and being opened when said plug is removed from said nipple;
(f) said switch having a resiliently moving member with a first contact pin which contacts a second contact pin as the cable plug is received by the nipple, said moving member being an insulating blade connected at one end to a resilient plate which is fixed to the camera housing, the other end of said insulating blade being positioned to be engaged and moved by a flash lamp cable plug being placed on said nipple.

References Cited

UNITED STATES PATENTS

| | | | |
|---|---|---|---|
| 3,072,028 | 1/1963 | Lange | 95—10 |
| 3,072,030 | 1/1963 | Wiessner et al. | 95—11.5 X |
| 3,147,680 | 9/1964 | Stimson | 95—10 |
| 3,283,681 | 11/1966 | Singer et al. | 95—11.5 X |
| 3,286,612 | 11/1966 | Lieser | 95—11 |
| 3,318,215 | 5/1967 | Schiks | 95—11.5 |

FOREIGN PATENTS 1,243,380  8/1960  France.

NORTON ANSHER, *Primary Examiner.*

JOSEPH F. PETERS, Jr., *Assistant Examiner.*